United States Patent [19]

Ramsey, Sr.

[11] Patent Number: 4,980,987
[45] Date of Patent: Jan. 1, 1991

[54] FISHING LURE WITH SELF-ACTIVATED HOOK

[76] Inventor: James W. Ramsey, Sr., 2870 St. Michael Dr., Missoula, Mont. 59803

[21] Appl. No.: 412,737
[22] Filed: Sep. 26, 1989
[51] Int. Cl.⁵ .............................................. A01K 85/00
[52] U.S. Cl. ...................................... 43/42.02; 43/34; 43/35
[58] Field of Search ..................... 43/35, 42.02, 42.04, 43/34

[56] References Cited

U.S. PATENT DOCUMENTS

| | | | |
|---|---|---|---|
| 2,521,555 | 9/1950 | Widmer | 43/35 |
| 2,576,532 | 11/1951 | Nudell | 43/42.04 |
| 3,618,251 | 11/1971 | Hodshire | 43/34 |
| 4,024,668 | 5/1977 | McDiarmid | 43/35 |
| 4,274,220 | 6/1981 | Rogers | 43/35 |

Primary Examiner—Richard K. Seidel
Assistant Examiner—Chuck Y. Mah
Attorney, Agent, or Firm—Sughrue, Mion, Zinn, Macpeak and Seas

[57] ABSTRACT

An artificial fishing lure such as a surface plug of streamline form has a lure body with a front and rear end and mounts at least one hook for movement longitudinally by its shank in an elongated slot between a forward position relative to the front of the body and a rearward position thereof. A fishing line is attached directly to the at least one hook and a coil spring or rubber band biases the hook in the retracted position. When the fish strikes the lure body, the hook automatically moves forwardly against the biasing means to hook the fish while the fish has the lure body grasped in its mouth. A wire support member mounted within the slot and fixed to the body slidably supports a wire hook carrier for movement longitudinally parallel to the wire support member. The wire support member may comprise a cylinder in line with the longitudinal axis of the lure body with a compression coil spring carried within the cylinder. A piston fixed to the hook carrier engages one end of the coil spring while the cylinder engages the other end of the coil spring. During striking of the fish and grasping of the lure body, the piston moves to compress the coil spring while the hook carrier shifts the at least one hook forwardly in the direction of the front of the lure body resulting in hooking of the fish.

8 Claims, 2 Drawing Sheets

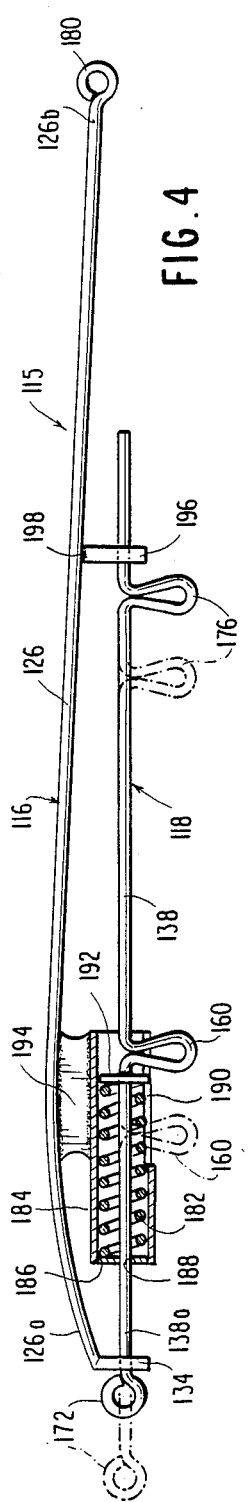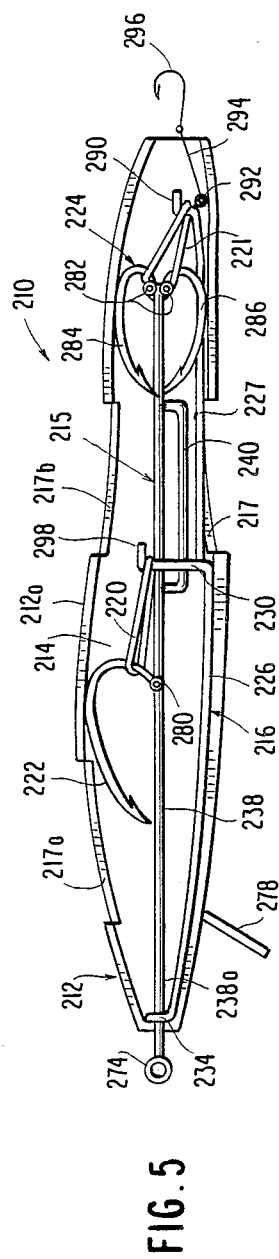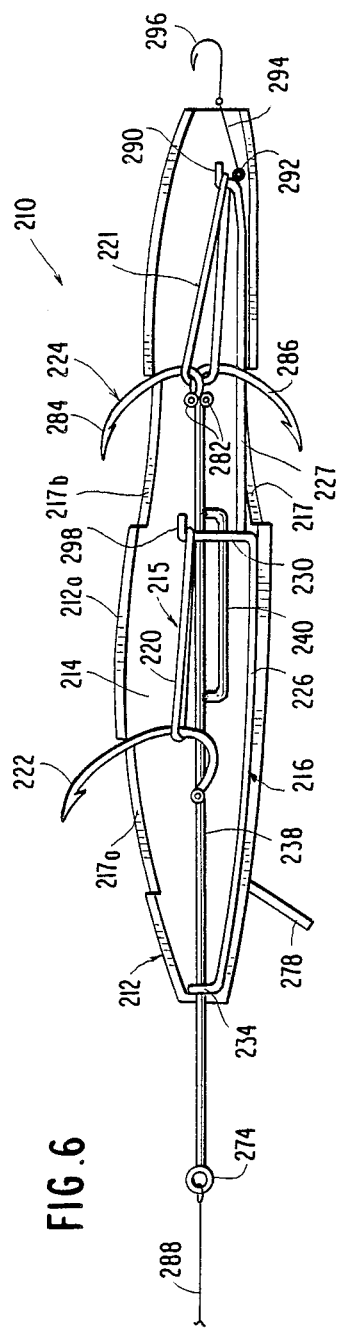

FISHING LURE WITH SELF-ACTIVATED HOOK

FIELD OF THE INVENTION

This invention relates to fishing lures, and more particularly to fishing lures with retractable and extensible hooks which move longitudinally in a forward direction relative to the lure body housing the same to hook the fish after the fish has grabbed the fishing lure body holding the hooks.

BACKGROUND OF THE INVENTION

Conventionally, fishing lures such as floating plugs have one or more single multiple barbed hooks mounted to the lure body at fixed locations such that the fish in grasping the plug in its mouth, either hooks himself, or the fisherman in reacting to the strike and upon pulling the line to which the lure is directly and fixedly attached pulls the hook or hooks into the fish's mouth by causing the plug to move despite the fishes grip on the plug.

In an attempt to facilitate the hooking of the fish upon the fish grasping the lure body, commonly simulating a bait fish and so shaped, one or more hooks have been mounted to a member reciprocating longitudinally within the lure body and which is spring biased into a projected or retracted position.

U.S. Pat. No. 2,244,271 to Voigt discloses a trap hook formed of a wire or rod element which includes a bait hook and a snag hook which independently slide with respect to each other. A resilient spring between the hooks prevents tangling. The fish in taking the bait hook, causes the bait hook to shift in the direction of the snag treble hook against the bias of a coil spring to snag the fish and further hold it.

U.S. Pat. Nos. 2,546,614 and 2,552,113 to Prentice provide a fishing lure which is spring activated to project a treble hook outwardly into the mouth of the fish once the lure is struck. The Prentice lures are designed to prevent fouling of trouble hooks with weeds.

U.S. Pat. No. 2,722,764 to Juhrend discloses a fishing lure in which the hooks project on striking of the fish from a retracted position where it normally resides to prevent fouling with the weeds as the lure is being pulled by the line fixed to the front of the lure.

U.S. Pat. No. 2,505,052 to Kridler discloses a plug type lure with a spring biased plunger projecting the treble hooks from the rear of the lure. The plunger is unlatched upon the fish striking the lure.

U.S. Pat. No. 2,538,883 to Warden discloses a fish lure in which multiple hooks have the shanks thereof maintained by friction in an initial position subject to strike by the fish. The shanks readily release from within a slit of the fish lure body, upon fish striking.

U.S. Pat. No. 1,791,084 to Pike teaches a spring biased plunger bearing two pivotal hooks which are normally retracted into slots within the lure body. A latch retains the plunger in a position where it compresses a biasing spring. The latch is released upon strike of the fish to project the hooks outwardly of the body and into the mouth of the fish grasping the artificial bait.

U.S. Pat. No. 3,006,100 to Zeman discloses a pair treble hooks on a lure body which are rotatable and held in close proximity to the body by catches, spring biased into a projected position. A latch release action takes effect upon the fish striking the body bearing the hooks.

While these lures intend to improve the percentage of hooked fish upon striking of the lure body, they are not always effective particularly where the lure is grasped by a large and/or tough-mouthed fish who grabs the lure so tightly that when the fisherman strikes, the lure, and therefore the hooks, do not move. Alternatively, if the hooks are released, they often do not move in a direction to impale the jaw of the fish.

It is therefore a primary object of the present invention to provide an improved fishing lure in which one or more hooks carried by the lure move forward towards the front of the lure to ensure hooking of the fish even though the lure is held tightly by the fish.

It is a further object of the present invention to provide a improved fishing lure in which the hooks are movable within the body of the lure, in a direction towards the front of the lure, and in which, the action is effected by connecting the fish line directly to a hook, or multiple hook assembly and not to the lure body.

It is a further object of the present invention to provide such a fishing lure in which the hooks are spring biased in a rearward direction with respect to the body slidably housing the same, by a metal coil spring or by one or more rubber bands.

SUMMARY OF THE INVENTION

An artificial fishing lure comprises a lure body having a front end and a rear end, means for mounting at least one hook mounted to said body for movement longitudinally therein and for projection outwardly between a forward position in the direction of the front of the body and a rearward position towards the rear thereof. Means are provided for attaching a fishing line to said at least one hook, and means for biasing the hook in a retracted position away from the front of said body. Upon a fish striking the lure body, the hook automatically moves forwardly against said biasing means to hook the fish.

The lure body may comprise an elongated, streamline body having a longitudinal slot within the same. A wire support member is mounted within said slot and fixed to said body. A wire hook carrier is mounted to said fixed wire support member for movement longitudinally parallel to the wire support member. Means are carried by said hook carrier for supporting said at least one hook projecting exterior of said slot and a eye is carried by said hook carrier for attachment directly to said line.

The wire support member may comprise a cylinder, in line with the longitudinal axis of a lure body of plug form a compression coil spring is carried within said cylinder. The hook carrier projects longitudinally through said cylinder and bears a piston or plunger piston engagable with one end of said coil spring. Means carried by said cylinder engage the other end of said coil spring whereby, upon grasping of the lure body by the fish, the piston moves to compress the coil spring and to shift the at least one hook forwardly in the direction of the front of the lure body by pull on the fish line. In shifting the at least one hook longitudinally the fish is hooked.

Alternatively, the biasing means may take the form of a rubber band engagable with said hook carrier and said wire support member to maintain said at least one hook retracted longitudinally in a direction away from the front of said lure. The rubber band permits said at least one hook to shift frontwardly in reaction to grasping of the lure body by the fish causing the rubber band to stretch during such movement. The at least one hook may be pivoted to said hook carrier, with said hook retracted by said rubber band within said slot, and interiorly of said lure body prior to strike of the lure body by said fish.

BRIEF DESCRIPTION OF THE DRAWINGS

FIG. 4 is a side elevational view of a wire frame carrier support and hook carrier for a fishing lure forming a further embodiment of the invention;

FIG. 5 is a vertical sectional view of a weedless moving hook minnow lure forming a further embodiment of the present invention, with front and rear hinged hooks retracted within the lure body prior to strike by a fish; and FIG. 6 is a similar vertical sectional view of the fishing lure of FIG. 5, after fish striking, and with the hooks projected outwardly from the interior of the lure body and moved longitudinally towards the front of said body.

DETAILED DESCRIPTION OF THE PREFERRED EMBODIMENTS

Figure 1:
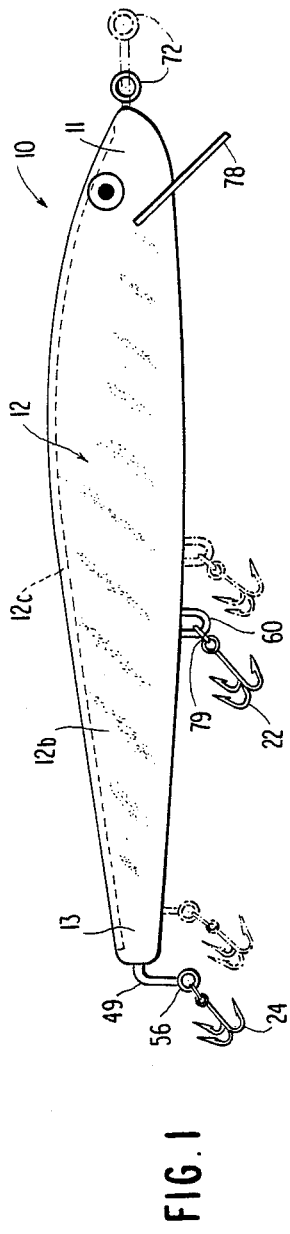
FIG. 1 is a side elevational view of a fishing lure forming a preferred embodiment of the invention.
Figure 2:
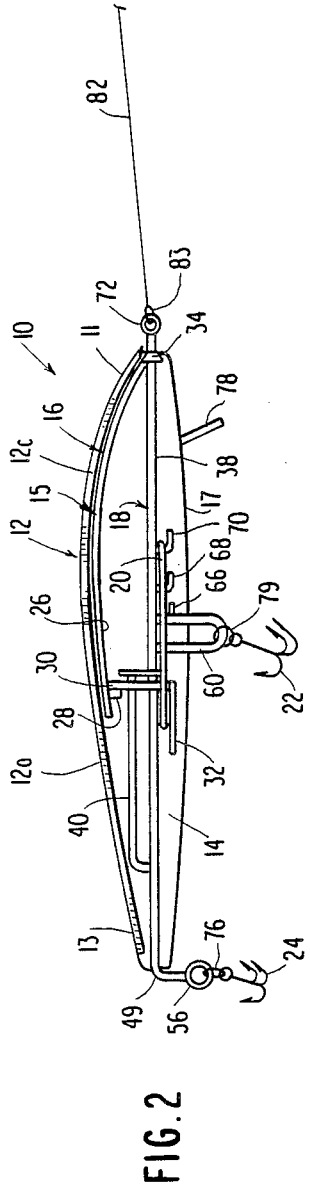
FIG. 2 is a vertical sectional view of the fishing lure of FIG. 1.
Figure 3:
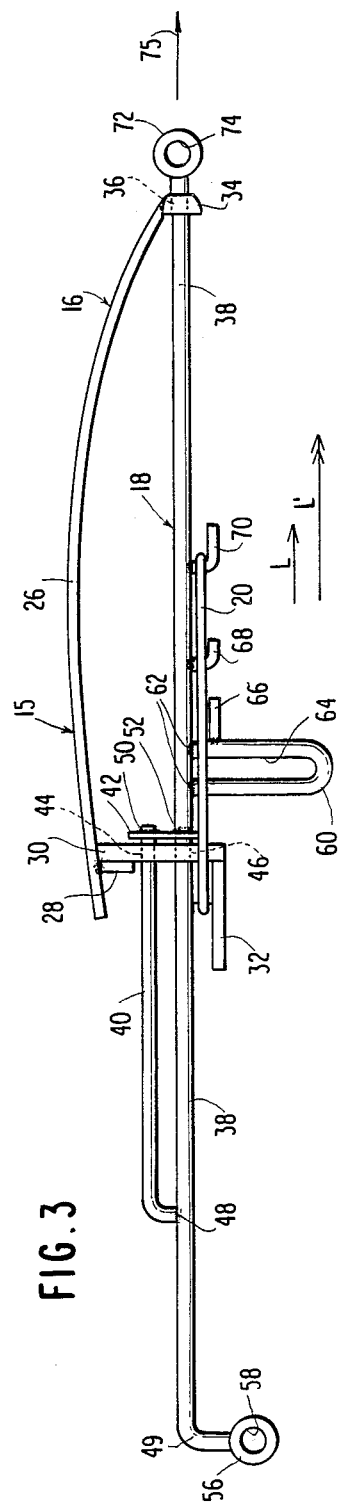
FIG. 3 is an enlarged, side elevational view of the wire frame carrier support and the fish hook carrier of the embodiment of FIG. 1.

In the embodiment of the invention as illustrated in FIGS. 1, 2 and 3, the fishing lure indicated generally at 10 comprises a body 12 in this case formed by two body halves, the body half 12a (FIG. 2) being a mirror image of the other body half 12b (FIG. 1) and which is joined along the vertical contact surfaces 12c by glue or adhesive. Such body takes a streamline form, simulating a minnow or small fish and having a front end 11 and a rear end 13. A recess 14 within each body half forms a vertically upright slot 17 when body halves 12a, 12b are joined within the body 12, from bottom towards the top within which is positioned an assembly 15 as indicated in FIG. 2 and consisting essentially of a wire frame carrier support 16, and a reciprocating hook carrier or carriage 18. Both the wire frame carriage support 16 and the hook carriage 18 are formed of wire rod material, preferably brass, and of other metal components which are soldered together.

The lure body halves such as halve 12a, are preferably formed of a soft wood such that the lure may float on the surface of the water. In order to provide some action simulating a live minnow, a turbulence plate 78 projects downwardly from the lure body 12 beneath the lure body and adjacent front end 11. The lure is completed by a middle treble hook 22 and a rear treble hook 24 in this embodiment.

It should be understood that the wire frame carriage support 16 is fixed within the vertical slot 17 formed by the internal recesses 14 within the body halves 12b, 12b and is fixedly mounted therein, as seen in FIG. 2, and extending longitudinally, fore and aft. In turn, the reciprocating hook carriage or hook carrier 18 is mounted on the wire frame carriage support 16 for movement in the longitudinal direction or axis of the lure body 12.

A vertical guide plate 30 is fixedly mounted to opposite sides to the respective body halves. Extending forwardly from the top of vertical plate 30 is a arcuate brass rod member 26 which terminates in a circular ring 34 having a bore 36 sized to slidably receive a straight brass carriage rod 38 forming a major element of the hook carriage or hook carrier 18. A ⅛ inch flat anchor 28 extends transversely across the rear face of guide plate 30 and is soldered both to the guide plate and the bottom of the arcuate brass rod 26. Ring 34 which functions as a bushing or bearing, is fixedly mounted by adhesive or the like to the wood body 12 of the lure. Guide plate 30 is provided with a pair of aligned circular holes 44, 46 within the same, at spaced vertical positions which are sized slightly larger than the diameter of the brass rod 38 which slidably projects through the hole 46, and a similar diameter guide rod 40. Rod 40 is of inverted L-shape configuration, and is soldered at one end at 48 to the top of brass rod 38, remote from guide plate 30. At its opposite end, the guide rod 40 projects through upper hole 44 within guide plate 30. A vertical stop, 42 having similar sized holes passing therethrough has rods 38, 40 projecting therethrough with the ends of the rods peened over or soldered to stop 42 as at 50 for guide rod 40 and at 52 for rod 38. Stop 42 is thus fixed at 52 to rod 38 and moves therewith. Rod 38 terminates at its forward end in a eye 72 having a hole 74 for direct attachment to the fishing line 82, FIG. 1, such that, a pull on the fishing line in the forward direction as indicated by arrow 75, FIG. 2, results in the reciprocation of the brass rod 38 from left to right through hole 46 within the guide plate 30, and bore 36 of ring 34 of the wire frame carriage support 11. At the rear end of the brass rod 38, there is provided a right-angle bend 49 which terminates in a rear hook attachment eye 56 having a hole 58 permitting the direct attachment of treble hook 24, FIG. 1. Such attachment may be made by a loop of wire, monofilament or the like at 76. Projecting rearwardly from the guide plate 30 is a first lug 32. Just in front of the stop 42 fixed to the brass rod 38 of the hood carriage 18 is a U-shaped forward hook attachment eye 60 with a vertically elongated opening 64 permitting the forward treble hook 22 to be loosely coupled thereto by way of monofilament or wire loop 79, FIG. 1. The U-shaped hook attachment eye may be soldered at 62 to the bottom of the brass rod 38. Projecting horizontally from the front edge of the forward hook attachment eye 60 is a lug 66. L-shaped lugs 68, 70 are soldered at longitudinally spaced positions to the bottom of rod 38 with openings formed thereby facing forwardly towards the front eye 72 of the assembly 15, FIG. 2.

As may be appreciated, a rubber band 20 is looped over the most forward lug 70 at one end. A rearwardly facing lug 32 carried by guide plate 30 receives the other end of rubber band 20 so as to set up a biasing force attempting to maintain the treble hooks 22, 24 retracted rearwardly at a first position relative to the wire frame carriage support 16 and thus the lure body 12 to which the wire frame carriage support 16 is fixedly mounted.

In operation, with the fishing line 82, FIG. 2, attached to eye 72 at the forward end of the brass rod 38 by a suitable knot 83, as the lure passes through the water (or on the surface of the water) in the direction of forward motion as indicated by arrow 75, the attack of the lure by the fish with the fish grabbing the same from the front, rear, or from the side causes, as the line 82 continues to move forwardly, the carriage 18 to move forwardly on the support 16. This results in stretching of the rubber band 20 with that stretching resisting the relative forward movement of the carriage 18 with respect to the wire frame carriage support 16. The extent of forward movement of the brass rod 38 relative to the wire frame carriage support 16 is indicated by the difference in arrows L (retracted length of the rubber band when retracted) and the double-headed arrow L. (the length of the rubber band when expanded or stretched). The lure 10 is designed such that a guide rod 40 and brass rod 38 move in unison sliding through respective holes 44, 46 of the guide plate to guide the brass carriage rod 38 in its longitudinal shift and to ensure that both treble hooks 22, 24 move forwardly to a second, forward position to the same extent as allowed by the stretch of the rubber band 20. The effect of this is to drive through the power of the fisherman and generated by the fishing rod (not shown) attached to the line 82 one or both hooks 22, 24 into the mouth of the fish while the fish securely and fixedly grasps the lure body 12 at that moment. The treble hooks 22, 24 are located respectively on the U-shaped forward hook attachment eye 60 and the rear hook attachment eye 56 so that movement of the reciprocable hook carriage 18 within the vertical slot 17 defined by the recesses 14 within the lure body halves, is unimpeded.

As may be appreciated, the lure 10 as shown in the illustrated embodiment of FIGS. 1 and 2 is formed of wood, and takes the configuration and makeup generally of a floating minnow-type lure sold under the registered trademark RAPALA. The wood body halves may be of balsa wood. etc. Alternatively, they may be formed of molded plastic or the body may be unitary with a preformed slot and with fillers at appropriate locations in the bottom slot 17 opening to partially close off the slot with the exception of the area of the projecting forward hook attachment eye 60 in over a length permitting its reciprocation longitudinally along with that of the rear hook attachment eye 56.

Turning next to FIG. 4, there is illustrated a modified form of the carriage support and the hook carriage assembly at 115 and which assembly, mounts within a suitable lure body such as lure body 12 of the embodiment of FIGS. 1, 2 and 3 and which may be readily substituted therefor. It should be noted, for assembly 115, the wire frame carriage support 116 is sized so as to extend the full length of the lure body. The arched, wire rod 126 terminates at rear end 126b in a unitary eye 180 to which a treble hook may be coupled such that hook remains at a fixed position on the lure body fixedly carrying the carriage support 116. In contrast, the reciprocating carriage rod 138 of the hook carriage 118 is provided with two depending unitary loops forming a forward hook attachment eye 160, and a mid hook attachment eye 176 which eyes 160, 176 while shiftable in forward and aft direction, ensures that the rearmost shiftable hook attachment eye 176 is always well forward of fixed eye 180 at the end 126b of the upper arched rod 126 of the wire frame carriage support 116.

Further, instead of using a rubber band as the biasing means as in the embodiment of FIGS. 1, 2 and 3, in this embodiment a compression coil spring 182 is employed. Spring 182 is mounted within the interior of a cylinder 184 formed of metal or the like, having a closed end wall 186 which is apertured at 188 and through which a portion of the lower, carriage rod 138 slidably projects. The cylinder has an open slot 190 within the bottom thereof over a portion of its length permitting the forward hook attachment eye 160 to run within slot 190. Further, just ahead of the forward hook attachment eye 160 there is fixedly mounted to the lower rod 138, a disk or piston 192 which abuts against one end of the coil spring 182 while the opposite end of that coil spring abuts apertured end wall 186 of the cylinder 184. A vertical mounting plate 194 aligned with the axis of carriage rod 138 is soldered to the exterior of the cylinder 184 along the lower edge thereof, and along an opposite upper edge to the bottom of the upper rod 126 of the wire frame carriage support 116. In like manner to the prior illustrated embodiment, the lower carriage rod 138 at its front end 138a terminates in an integral, circular line attachment eye 172. In order to guide the reciprocating lower carriage rod 138, the upper rod 126 includes integrally, at its forward end 126a, an eye 134 through which the wire carriage rod 138 slides. Depending from the upper rod 126 is a rear guide eye 196 which may be soldered as at 198 to the bottom of the upper rod 126. Eye 196 is positioned so that an opening therein is in line with the opening of the front guide eye 134. The wire carriage rod 138 terminates at its rear in a straight portion 138b which rides within the rear guide eye 196, throughout reciprocation of carriage 118. Appropriately, treble hooks such as those at 22, 24, FIG. 1, are mounted to the integral loops 160, 176 forming the forward hook attachment eye and rearward hook attachment eye, respectively. The loops 160, 176 extend downwardly so that the ends thereof project outwardly of the vertical slot formed within the lure body (not shown) in this embodiment.

In FIG. 4, the dotted line positions for the line attachment eye 172 of the lower carriage rod 138 and the lower carriage rod itself as well as the forward hook attachment eye 160 and rearward hook attachment eye 176 show the extent of forward shift of the hooks upon grasping of the lure body by the fish when the assembly 115 of FIG. 4 is substituted for assembly 15 of the embodiment of FIGS. 1 and 2. The action is identical and the hooking of the fish is materially improved since hooking is self-actuated by the fish who grasps the exterior body of the lure but cannot prevent the continued tension on the fishing line, such as line 82, FIG. 1, from shifting the several treble hooks forward from a first longitudinal position to a second longitudinal position and into the tough mouth of the fish against the bias of coil spring 192 as long as the fish retains the lure body in its mouth after striking.

Referring next to FIGS. 5 and 6, a third embodiment of the invention is shown in the form of a weedless moving hook minnow lure indicated generally at 210 and comprised of a similar type of minnow lure body, 212 as that of the embodiment of FIGS. 1, 2 and 3. The body 212 is provided with a turbulence plate 278 projecting downwardly and forwardly from the bottom of the same at the forward end 211 of the body. FIGS. 5 and 6 show vertical sectional views a half body 212a which bears a recess 214 and forming with an adjacent mirror image lure body halve, a vertical slot within the lure body 212 within which is positioned a carriage support and hook carriage assembly indicated generally at 215. The makeup is very similar to that of the embodiment of FIGS. 1, 2 and 3 with the exception that the hooks are purposely formed so as to be pivotably supported within the body and normally retracted internally within portions of the vertical slot 217 of the body. Additionally, the hook carriage 216 and a wire frame carriage support 216, respectively, are reversely positioned; the wire frame carriage support 216 is on the bottom rather than the top. The wire frame carriage support 216 includes an arched wire rod 226 which at its forward end, is integrally provided with a ring 234 through which projects the forward end of carriage rod 238 of the hook carriage 218. Extending upwardly from the opposite end of wire frame carriage support 216 is a vertical guide plate 230 which has its opposite sides fixed to the lure body halves such as body half 212a, FIG. 5. Plate 230 has vertically aligned apertures or holes through which slidably extend carriage rod 238 and L-shaped guide rod 240, respectively. The rear end of guide rod 240 is bent at right angles and soldered or otherwise affixed to the bottom of carriage rod 238. The nature of the support and reciprocation of the hook carriage 216 is nearly identical to that of the embodiment of FIGS. 2 and 3. The principle difference resides in the nature of the front hook 222, and rear hook assembly 224. Single hook 222 has its shank pivotally mounted by a hinge 280, to rod 238 forward of plate 230 for hook projection upward by and outwardly through slot 217a. Well rearwardly of the plate 230 and at the rear juncture between guide rod 240 and carriage rod 238 of the hook carriage 218, hooks 284, 286 of hook assembly 224 are respectively pivotally mounted to hook carriage 218 through hinges 282. The upper and lower hooks 284, 286 projecting in opposite directions through appropriate slots, 217b, 217 respectively within the lure body 212. Further, fixed wire frame carriage support 216 includes a wire rod portion 227 which terminates in a rearwardly directed lug 290, behind the rear set of movable hooks 284, 286.

A single rubber band 220 has one end looped about the single forward pivotable hook 222, extends rearwardly along the sides of the plate 230, with the other end of rubber band 220 looped over a lug 298. A separate rubber band 221 engages both the upper and lower rear hooks 284, 286 and extends about a lug 290 of support 216 to maintain tension on the hooks 222, 284, 286. Further, in addition to causing the hooks 222 and 284 to pivot clockwise as viewed in FIGS. 5 and 6, the rubber bands 220, 221 cause retraction of the hook carriage 218. Rubber band 221 further causes counterclockwise rotation of the lower pivoted rear hook 286. Eye 274 of the hook carriage rod 238 shifts rearwardly from the dotted line position shown in FIG. 5 to the full line position in FIG. 6 under the bias of rubber band 220, 221.

Additionally, in the illustrated embodiment of FIGS. 5 and 6, there is provided a stinger hook 296 which is connected by a piece of monofilament or wire 294 to a eye 292 of a portion of the rod 227 of the wire frame carriage support 216. The barb of hook 296 is exposed on the exterior of the lure body 212 at all times. As may be appreciated, the hooks 222, 284, 286 (except for the stinger hook 296 in the tail) move forward approximately 1 inch when the hook is set by the tension exerted by a fishing line 288 tied to eye 274 upon striking of the lure 212 by a fish. The hooks 222, 284, 286 fold into to the lure body 212 when the back of curved outer face of the shanks of these hooks bump up against the outside edges of the lure body 212 causing the hinges 280, 282 to close for respective hooks.

With the line 288 under tension, upon the striking of the lure by the fish and the grasping of the body 212 in the mouth of the fish, the hooks 222, 284, 286 pop out of slots 217a, 217b and 217 within the lure body due to the two rubber bands pulling the hooks open as the fisherman sets the hook. The hooks 222, 284, 286 move forward approximately 1 inch as shown in the full line position of FIG. 6. Rubber band 220 loops at its rear about a lug 298 and the second rubber band 221 acts only on the hooks 284, 286 with one end looped over the lug 290, FIG. 5.

The lure 210 of FIGS. 5 and 6, is very a effective weedless lure with the rubber bands 220, 221 performing dual functions, one of which is to provide the bias for the pivotal hooks for pivoting from a retracted closed position within the lure body 212. FIG. 5, to a snap open position, FIG. 6, upon the striking of a fish while providing the resistance to movement of the rod 238 of assembly 215 forwardly due to the tension set up within fishing line 288 as a result of a fish strike.

If the fish should get off the hooks 222, 284, 286, of the lure 210, the lure again takes the hook closed position shown in FIG. 5 with the hooks retracted into the lure body except for the stinger hook 296.

While the drawings have shown the various embodiments of the invention, the employment of multiple body halves which are adhesively cemented together after the frame and carriage assemblies are mounted therein may be also appreciated by reference to the patents discussed at some detail above, the present invention being an improvement within the art as disclosed by those references.

It is to be noted that various changes may be made without departing from the spirit of my invention and I therefore desire to be extended protection as defined by the appended claims.

What I claim is:

1. An artificial fishing lure comprising:
a lure body having a longitudinal axis, a front end and a rear end, at least one hook,
means for mounting said at least one hook to said body for movement longitudinally from a retracted, rearward, first longitudinal position in the direction of the front of the body to a second longitudinal position forwardly thereof in the direction of the front of the body,
means for attaching a fishing line to said at least one hook, and
means for biasing the hook in said retracted, rearward first position away from the front of the body such that, upon a fish striking the lure body, the hook automatically moves longitudinally forward against said biasing means to said second position to hook the fish while the fish grasps the lure body.

2. The artificial fishing lure as claimed in claim 1, wherein said lure body is an elongated, streamline member, having a longitudinal slot within the same, and wherein, said at least one hook is mounted within said slot for movement fore and aft, of said body.

3. The artificial fishing lure as claimed in claim 2, wherein said means for mounting said at least one hook comprises a wire frame support member mounted within said slot and fixed to said body, a wire hook carrier mounted to said fixed wire frame support member for movement longitudinally within said body, parallel to said wire frame support member, and means carried by said hook carrier for supporting said at least one hook having a shank projectable exterior of said slot.

4. The artificial fishing lure as claimed in claim 3, wherein an eye is carried by said hook carrier at a position thereof proximate to the front of said body for attachment directly to said line.

5. The artificial fishing lure as claimed in claim 4, wherein said wire support member comprises a cylinder in line with the longitudinal axis of said lure body, a compression coil spring carried within said cylinder, said wire hook carrier having a carriage rod projecting longitudinally through said cylinder and slidably mounted thereon, a piston fixed to said carriage and slidably mounted within said cylinder and engagable with one end of said coil spring, and means carried by said cylinder for engaging the other end of the coil spring whereby, upon grasping of the lure body by the fish, the piston moves to compress the coil spring such that the hook in moving forwardly in the direction of the front of the lure body under tension on the fish line, the fish is hooked thereby.

6. The artificial fishing lure as claimed in claim 5, wherein said biasing means comprises a rubber band engagable with said hook carrier and said wire frame support member for maintaining said at least one hook retracted longitudinally in a direction away from the front of said lure.

7. The artificial fishing lure as claimed in claim 6, wherein said at least one hook comprises a shank and a barb, means for pivotably mounting said shank to said hook carrier and a rubber band engaging said hook shank at one end and at its opposite end said hook carrier and wherein, the length of said rubber band and the positioning of said at least one hook relative to said lure body is such that, said at least one hook is maintained retracted within said hook body at said retracted, rearward, first position remote from the front of said lure body by said rubber band, whereby, in response to tension on the fish line, the hook carrier is projected forwardly along with said at least one hook against the bias of the rubber band which stretches to cause the hook to pivot from a retracted position internally within the lure body to one where said barb projects outwardly therefrom and to move simultaneously forwardly in the direction of the front of said lure body to said second position thereby hooking the fish grasping said lure body as a result of the strike of the lure body by said fish.

8. The artificial fishing lure as claimed in claim 6, wherein said at least one hook comprises a pair of hooks pivoted to said hook carrier to opposite sides thereof with said barbs projectable exteriorly of said lure body through aligned slots therein, and wherein, a unitary rubber band is looped over both said hooks at shank portions pivotally coupled to said hook carrier, wherein said oppositely directed hooks are mounted within said lure body having shank portions engagable with the lure body to maintain the hooks in said rearward, retracted first position internally within the body, the tensioning of said fish line upon the strike of the lure body of said fish and movement of the hook carrier forwardly in said body causes stretching of the rubber band and pivoting of the hooks into a barb outwardly projecting position against the bias of the rubber band.

* * * * *